July 25, 1950

E. C. GILLETT 2,516,694

SPAN MEASURING DEVICE FOR BOWLING
BALLS AND THE LIKE

Filed Nov. 30, 1946

INVENTOR.
Edward C. Gillett,
BY

July 25, 1950 E. C. GILLETT 2,516,694
SPAN MEASURING DEVICE FOR BOWLING
BALLS AND THE LIKE
Filed Nov. 30, 1946 2 Sheets-Sheet 2
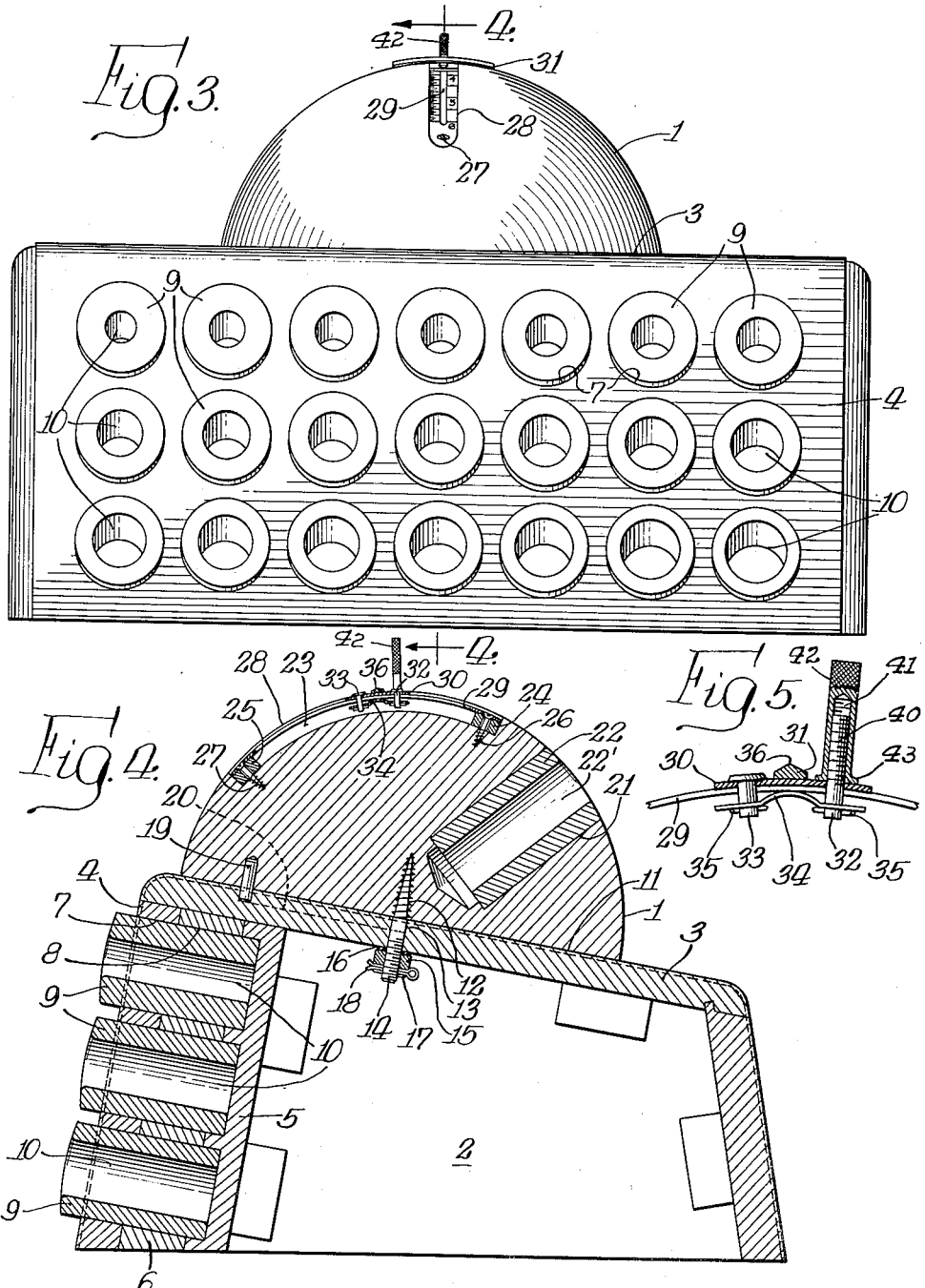
INVENTOR.
Edward C. Gillett,
BY Patented July 25, 1950

2,516,694

UNITED STATES PATENT OFFICE 2,516,694

SPAN MEASURING DEVICE FOR BOWLING BALLS AND THE LIKE

Edward C. Gillett, Evanston, Ill., assignor to The Brunswick-Balke-Collender Company, Chicago, Ill., a corporation of Delaware Application November 30, 1946, Serial No. 713,344

8 Claims. (Cl. 33—174)

This invention relates to a span measuring device for bowling balls and the like, and more particularly to such device by which the purchaser of a bowling ball may be accurately measured for span or grip directly upon a ball model in a natural, convenient and positive manner.

Span or grip measuring devices as heretofore known have been accompanied by inconvenience in use, with complications in manipulations and difficulty of securing of the correct measurement. This I have overcome in the present invention by providing a ball model on which the hand of the purchaser may be laid in a natural and easy manner, and the correct measurement read from the upper surface of the device.

Among the objects of my invention are: to provide a novel and improved span measuring device for bowling balls and the like; to provide a device of the character referred to having substantially one half of a bowling ball rotatably mounted upon a supporting surface and a scale with a movable slide mounted upon the upper surface of the ball; to provide a ball model having a thumb hole member removably mounted therein and an adjustable scale coordinated with the thumb hole member on the upper surface of the ball model; to provide a novel arrangement of adjustable scale and thumb hole member in a spherically curved surface; to provide a span measuring device having a spherically curved surface provided with a thumb hole and a scale having a slide with a ridge to be seated in the crease on the inner side of the middle joint of the purchaser's finger; and to provide a support having a half of a bowling ball carrying the measuring device, and a plurality of members for measuring the size of the finger available in the support.

Other objects and advantages will become readily apparent from the following detailed description taken in connection with the accompanying drawings, wherein:

Fig. 3 is a side elevation looking toward the upper side of Fig. 2.

Fig. 4 is a vertical transverse section taken on a plane passing through the center of the hemisphere of the measuring device.

Fig. 5 is an enlarged side edge elevation of the slide arm and a portion of the scale.

Figure 1:
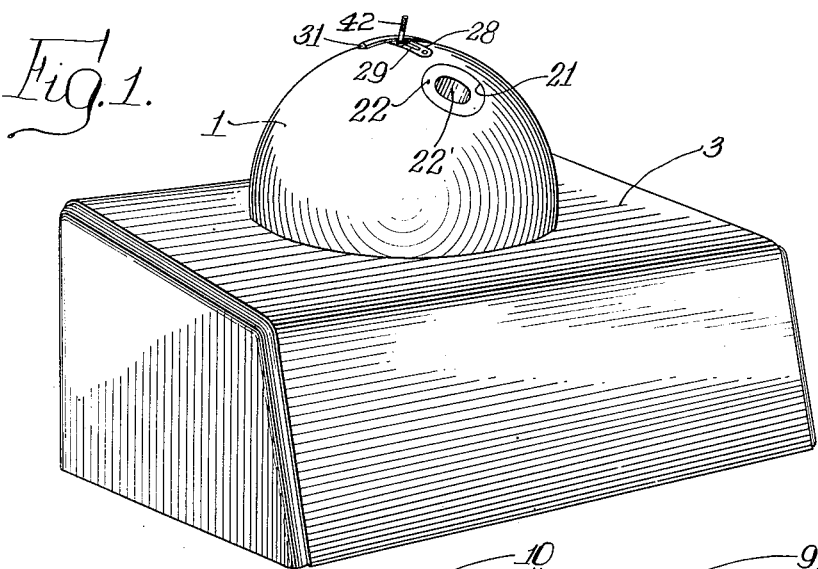
Fig. 1 is a perspective view of a supporting member and span measuring device embodying my invention.

While my invention further resides in the combination, construction and arrangement of parts illustrated in the accompanying drawings, I have shown therein, for illustrative purposes only, a preferred embodiment, and wish it understood that the same is susceptible of modification and change without departing from the spirit and scope of the appended claims.

In the form shown in the drawings my invention comprises a hemispherical member 1 which is substantially one-half of a standard size bowling ball without the finger hole or holes formed therein. This hemisphere is rotatably mounted upon a box-like support 2 having side and end walls and an inclined top 3. The front wall 4 is provided with an inwardly positioned partition 5 and an intermediate filling member 6. The front wall 4, and the intermediate filling member 6, are provided with a plurality of rows of holes 7 and 8 which are circular in cross section and extend partially into the partition member 5. In each of these holes 7—8 is removably positioned a sleeve 9 having a concentric longitudinally extending hole 10. These holes 10 in sleeves 9 are graduated diametrically so as to progressively increase in size from the smallest hole as shown at the left hand side of the top row in Fig. 3 to the largest hole in the right hand side of the bottom row. The purpose of these progressively increasing holes in the sleeves 9 is to enable the salesman to select the desired size of hole as determined by the purchaser's finger being inserted into the one having the size for his particular finger.

The hemisphere 1 has centrally screwed into its lower flat surface 11 a screw member 12 having an unthreaded portion extending through an opening 13 in the top 3 of the supporting table. Member 12 is formed at its lower end with screw threads 14 upon which is threadably mounted a nut 15. Between the nut 15 and the under face of top 3 is mounted a washer 16. Nut 15 on its lower face is provided with a plurality of radial grooves 17 for selectively receiving a cotter pin 18 when the nut is screwed onto the threaded end 14 to get the desired snugness of rotational fit.

Figure 2:
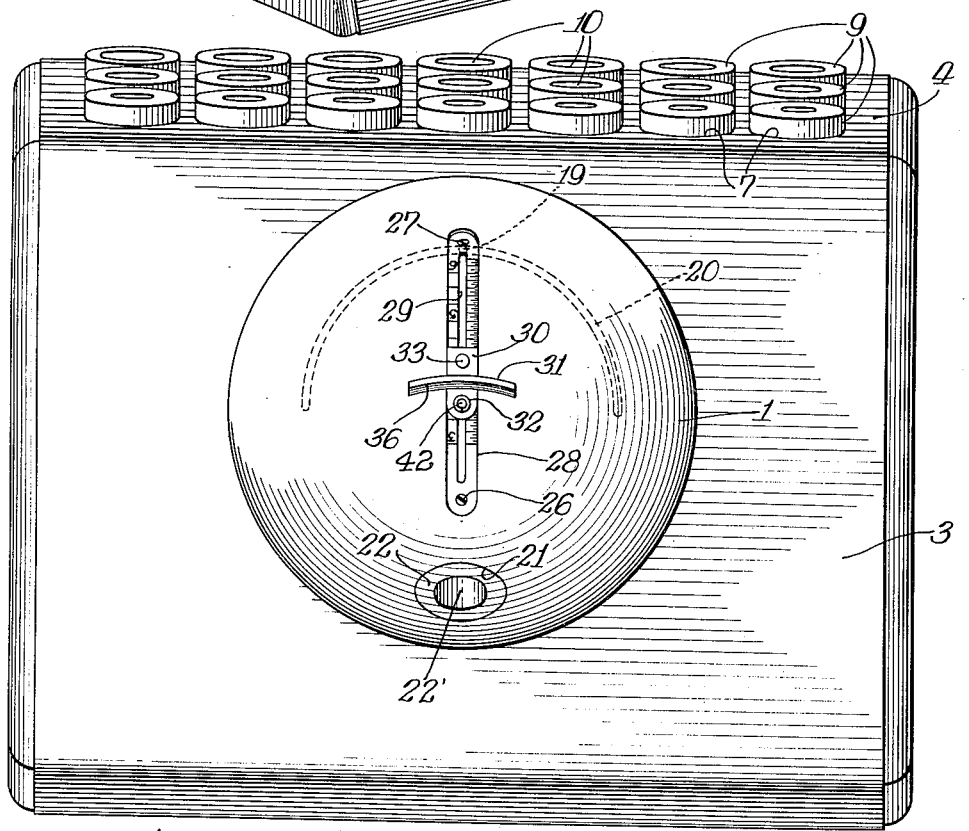
Fig. 2 is a top plan view of Fig. 1, on an enlarged scale.

Fixed in the bottom side of the hemisphere 1 is pin 19 which extends downwardly below frame face 11 a short distance to be slidably mounted in the arcuate slot 20 as shown in Figs. 2 and 4. This pin and slot connection permits the hemisphere 1 to be rotated throughout approximately 180° with relation to the table top 3. Hemisphere 1 is provided with a circular opening 21 extending approximately radially therein to removably receive a sleeve member 22 having a longitudinal opening 22' of a size to receive the thumb of the bowling ball purchaser. If desired, the sleeve 22 may be one of the finger sleeves 9 selected of a size to properly fit the thumb of the purchaser, or special sleeves may be used for the thumb if preferred. Formed in the upper surface of the hemisphere 1 is an arcuate groove 23 in alinement with the center of the thumb hole 22' and preferably positioned in a plane passing through the center of rotation of the hemisphere and the center of the outside end of hole 22'. As seen in Fig. 4, groove 23 stops short a short distance from the nearest edge of hole 21 of the thumb sleeve 22.

Fixed in the respective ends of groove 23 are spacer washers 24 and 25 to which washers are fixed by screws 26 and 27 the respective ends of a scale member 28, preferably of a curved thin metal strip having a longitudinally extending slot 29. Slidably mounted upon scale member 28 is a slide 30 having fixed to extend preferably equal distances on each side thereof a slide arm 31 preferably curved in the arc of a circle having the outside center of the hole 22' as an approximate center.

As seen in Fig. 5, slide 30 has mounted in its respective ends pins 32 and 33 passing inwardly through slot 29. Pin 33 is held against longitudinal movement with relation to the slide, but pin 32 is movable upwardly and downwardly with relation thereto. Slidably mounted upon pins 32—33, by means of holes passing over these pins is a bowed leaf spring 34 which at its upwardly bowed center contacts the under face of the scale member 28 and is held under tension upon these pins by means of cotter pins or the like 35. The frictional engagement between these parts is such that when the slide 30 is moved along the scale member 28 it will be frictionally held in such position where it is stopped. As seen in Fig. 5, the slide arm 31 is on its upper face formed with two inclined faces meeting in a longitudinally extending ridge 36, adapted to receive thereover the crease on the under side of the middle joint of an individual's finger when being measured for span.

As seen in Figs. 2 and 3, scale 28 is graduated into inches and fractions of an inch so located on the scale that, when the slide arm and slide are moved longitudinally along the scale to where the crease of the middle joint of the purchaser's finger rests over the ridge 36, it will register in inches the necessary span for that particular individual's hand. This measurement is then used to locate the position of the finger hole on the desired bowling ball. After the span distance of the purchaser's finger has been measured in the manner referred to above, the purchaser will select from the appropriate one of the sleeves 9 the proper size of finger hole to accommodate his finger in the bowling ball being purchased. This size hole will then be bored in the proper position for span as measured by the present span measuring device.

As seen in Fig. 4, the friction means for preventing the slide and slide arm from inadvertently moving out of position after the measurement has been taken, is located in the groove 23, as the result of which the upstanding ridge 36 of the slide arm is substantially the only part standing up beyond the circumference of the hemisphere and hence is readily available at all times to receive the crease on the under side of the middle joint of the purchaser's finger when being measured.

When a purchaser of a new bowling ball is being measured he will approach the right hand side of the table 3 shown in Fig. 4, insert his thumb in the thumb hole 22' and at the same time place his open hand across the upper face of the hemisphere 1. The salesman will then move the slide and slide arm along the scale until the ridge 36 is fitted into the crease on the under side of the middle joint of the purchaser's finger. The measurement of the span of the purchaser's hand will then be read on the scale 28 and this measurement jotted down for proper boring of the finger hole for that particular purchaser. As stated above, the size of the finger hole will be determined by trying out the purchaser's finger in the holes in sleeves 9 until the proper size is selected. If the ball purchased is to be a two finger hole ball, the measurement for the additional finger will be taken in the same manner as described above. It is accordingly seen that by use of this device the correct span of a bowler's hand may be accurately obtained so that the purchaser may select a ball to be purchased and have a feeling of assurance that the span of the finished ball will be correct.

In order to give more positive assurance that the slide will not be inadvertently moved after the measurement has been taken, the upper end portion of pin 32 is threaded at 40 to engage complemental threads 41 in the hollow interior of the locking member 42. Annular flange 43 is formed on the bottom end of the locking member 42 to give added bearing surface for contacting the upper surface of the scale. After the measurement has been taken the locking member 42 will be given one or more turns in the tightening direction which will increase the pressure of spring 34 against the under surface of the scale sufficiently to lock the slide against inadvertent movement along the scale. This will insure that the measurement indicated on the scale will not be disturbed even after some delay in reading the same. Movement of the locking member 42 a desired amount in the unscrewing direction will restore the parts for longitudinal movement along the scale as before. The degree of sliding friction between the scale and the slide may be selectively adjusted as desired by adjustment of the locking member 42.

I claim:

1. A span measuring device for bowling balls and the like, comprising, a supporting table, approximately a half of a bowling ball mounted on said table with its spherically curved surface facing upwardly, said half ball having a hole in its upper curved surface, a sleeve removably mounted in said hole and having a concentric thumb hole therein, an elongated scale member fixed to the ball curved surface opposite said thumb hole and in line with the outside end of the hole, a slide arm slidably mounted on said scale, and means on said slide arm frictionally engaging the scale to hold the slide arm stationary on the scale but permit its movement for measuring the span between the center of the thumb hole and the crease of a purchaser's middle and ring fingers.

2. A span measuring device for bowling balls and the like, comprising, a supporting member, a hemispherical member having a flat surface rotatably mounted on said supporting member, said hemispherical member having an opening extending angularly into one side of its spherically curved surface, a sleeve removably mounted in said angular opening and having a concentric thumb hole therein, said spherically curved surface having an elongated slot opposite the outer end of said sleeve, a scale mounted in said slot at a fixed distance from the center of said thumb hole and a slide arm slidably mounted on said scale, the center line of said slot lying in a plane common with the center line of said opening, said plane passing through the spherical center of the hemispherical member.

3. A span measuring device for bowling balls and the like, comprising, a supporting table, approximately a half of a bowling ball mounted on said table with its spherically curved surface facing upwardly, said half ball having a hole in its upper curved surface, a sleeve removably mounted in said hole and having a thumb hole therein, an elongated scale member fixed to the ball curved surface opposite said thumb hole, a slide arm slidably mounted on said scale, and means on said slide arm frictionally engaging the scale to hold the slide arm stationary on the scale but permit its movement for measuring purposes, said slide arm being provided with an upwardly facing laterally extending ridge to receive the crease of the middle joint of an individual's finger when being measured for span.

4. A span measuring device for bowling balls and the like, comprising, a supporting table, approximately a half of a bowling ball mounted on said table with its spherically curved surface facing upwardly, said half ball having a hole in its upper curved surface, a sleeve removably mounted in said hole and having a thumb hole therein, an elongated scale member fixed to the ball curved surface opposite said thumb hole, a slide arm slidably mounted on said scale, and means on said slide arm frictionally engaging the scale to hold the slide arm stationary on the scale but permit its movement for measuring purposes, said slide arm being provided with an upwardly facing laterally extending ridge to receive the crease of the middle joint of an individual's finger when being measured for span, said ridge being curved on a curvature having a radius whose center approximately coincides with the center of the outer end of the thumb hole.

5. A span measuring device for bowling balls and the like, comprising, a half sphere constituting approximately one half of a standard bowling ball, said half sphere having a thumb hole and a spherically curved scale member opposite said hole, the longitudinal center line of the scale and the center of the outer end of the thumb hole being in a plane passing through the spherical center of the half sphere, and a slide arm slidable on the scale for measuring the span of a purchaser's hand whose thumb is inserted in the thumb hole, the slide arm having on its upper face a ridge and which slide arm extends laterally on both sides of the scale, said ridge extending the full length of said lateral extensions and being curved on a radius with a center approximately coinciding with the center of the outer end of the thumb hole.

6. A span measuring device for bowling balls and the like, comprising, a supporting member, a hemispherical member having a flat surface rotatably mounted on said supporting member, said hemispherical member having an opening extending angularly into one side of its spherically curved surface, a sleeve removably mounted in said angular opening, said spherically curved surface having an elongated slot opposite the outer end of said sleeve, a scale mounted in said slot and a slide arm slidably mounted on said scale, said slide arm being formed with a laterally extending curved ridge.

7. A span measuring device for bowling balls and the like, comprising, a supporting member, a hemispherical member having a flat surface rotatably mounted on said supporting member, said hemispherical member having an opening extending angularly into one side of its spherically curved surface, a sleeve removably mounted in said angular opening, said spherically curved surface having an elongated slot opposite the outer end of said sleeve, a scale mounted in said slot and a slide arm slidably mounted on said scale, said slide arm being formed with a laterally extending curved ridge, said scale having an elongated slot, said slide arm having a pin extending through the scale slot, and friction means on said pin bearing against the inner face of the scale to frictionally hold the slide arm in adjusted positions on the scale.

8. A span measuring device for bowling balls and the like, comprising, a supporting member, a hemispherical member having a flat surface rotatably mounted on said supporting member, said hemispherical member having an opening extending angularly into one side of its spherically curved surface, a sleeve removably mounted in said angular opening, said spherically curved surface having an elongated slot opposite the outer end of said sleeve, a scale mounted in said slot and a slide arm slidably mounted on said scale, said slide arm being provided with means for locking it against inadvertent sliding movement longitudinally of the scale, said means including an adjustable element for forcing the slide arm against the scale.

EDWARD C. GILLETT.

REFERENCES CITED

The following references are of record in the file of this patent:

UNITED STATES PATENTS

| Number | Name | Date |
|---|---|---|
| 1,689,040 | Marron | Oct. 23, 1928 |
| 1,873,663 | Pietzuch | Aug. 23, 1932 |
| 2,207,404 | Hinkley | July 9, 1940 |
| 2,242,980 | Nicholas | May 20, 1941 |
| 2,314,811 | Akin | Mar. 23, 1943 |
| 2,377,067 | Bloomberg | May 29, 1945 |